UNITED STATES PATENT OFFICE.

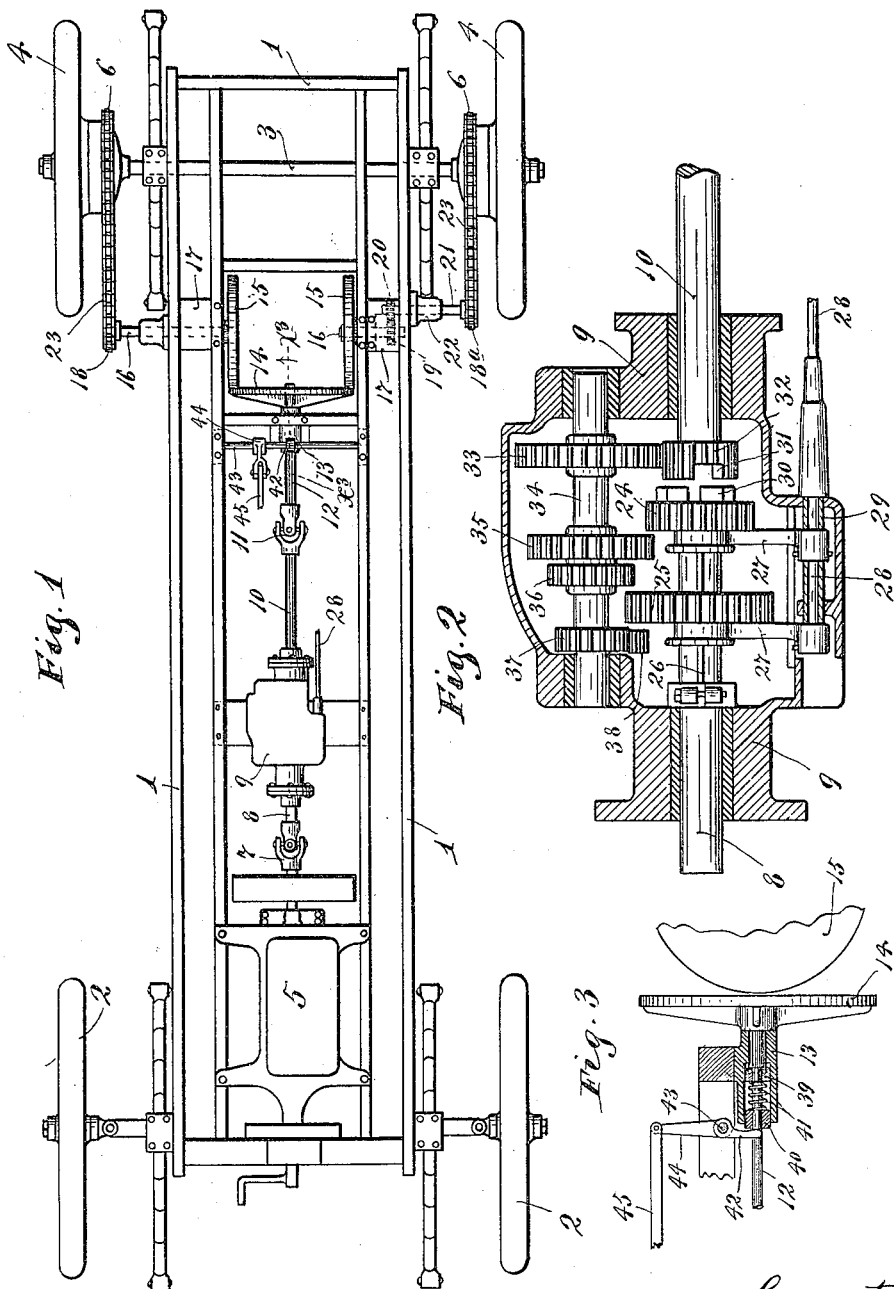

ROBERT E. CARSWELL, OF MINNEAPOLIS, MINNESOTA.

TRANSMISSION MECHANISM FOR AUTOMOBILES.

1,143,037.   Specification of Letters Patent.   Patented June 15, 1915.

Application filed April 13, 1914. Serial No. 831,358.

*To all whom it may concern:*

Be it known that I, ROBERT E. CARSWELL, a citizen of the United States, residing at Minneapolis, in the county of Hennepin and State of Minnesota, have invented certain new and useful Improvements in Transmission Mechanism for Automobiles; and I do hereby declare the following to be a full, clear, and exact description of the invention, such as will enable others skilled in the art to which it appertains to make and use the same.

My invention has for its object to provide an improved transmission mechanism for automobiles or motor propelled vehicles, wherein a frictional differential gear mechanism having non-adjustable or definitely located friction wheels, is used in combination with a reversible variable speed toothed gear mechanism; and wherein the motion transmitted from the engine is either reversed or converted into the desired speed before it is transmitted to the frictional differential gear mechanism.

To such ends, generally stated, the invention consists of the novel devices and combinations of devices hereinafter described and defined in the claims.

In the accompanying drawings which illustrate the invention, like characters indicate like parts throughout the several views.

Referring to the drawings: Figure 1 is a plan view showing the improved transmission mechanism applied to an automobile; Fig. 2 is a view partly in horizontal section and partly in plan showing the reversible variable speed gear mechanism; and Fig. 3 is a section taken approximately on the line $x^3$ $x^3$ on Fig. 1, some parts being shown in full.

Of the parts of the chassis of the automobile, it is only desirable to note the framework 1, front wheels 2, rear axle 3, rear or traction wheels 4 and the engine 5. The rear traction wheels 4 are mounted on the rear axle 3 for differential rotary movements, and on their hubs, they carry sprockets 6. The engine crank shaft proper, at its rearwardly projecting end, is, as shown, connected by a knuckle joint 7 to an axially alined shaft 8 journaled in a gear casing 9 rigidly secured on the framework 1. The casing 9, incloses the coöperating spur gears of the reversible variable speed transmission device. The front end of a shaft 10, that is axially alined with the shaft 8, is also journaled in the casing 9, and its rear end is, as shown, connected by a knuckle joint 11 to the front end of an axially alined shaft 12 that is journaled in a suitable bearing 13 on the framework 1 and is equipped at its rear end with a face friction wheel 14. The face friction wheel 14 runs in frictional engagement with the peripheries of a pair of peripheral friction wheels 15 that are secured on the inner ends of short axially alined counter shafts 16, which counter shafts are extended transversely of the frame 1 and are journaled in suitable bearings 17 secured on the sides of the said frame. The outer end of one of the shafts 16 carries a sprocket 18, while the outer end of the other shaft 16 carries a spur gear 19 that meshes with a similar spur gear 20 secured on the inner end of a supplemental counter shaft 21, shown as journaled in a bearing 22 secured on the adjacent side of the frame 1. The outer end of the supplemental counter shaft 21 is provided with a sprocket $18^a$. Sprocket chains 23 run over the sprocket 6 on the hubs of the traction wheels 4, and over the alined sprockets 18 and $18^a$.

The friction wheels 14 and 15 constitute the frictional differential gear, and it will, of course, be understood that the gears 19 and 20 and supplemental shaft 21 are provided for the purpose of transmitting motion so that both traction wheels will be driven in the same direction from the reversely rotated friction wheels 15, which friction wheels are located on opposite sides of the axis of the face friction wheel 14 which drives them. The said friction wheels 15 are always kept at their maximum distance from the axis of the face friction wheel 14 where they have the greatest driving efficiency. It is a well known fact that when peripheral friction wheels are moved close to the axis of the coöperating face friction wheel, there is a very greatly increased loss in power due to slippage or conflicting friction.

It is important to note that in this improved transmission mechanism, the coöperating friction wheels 14 and 15 afford a frictional differential gear mechanism. However, the said friction wheels are preferably, also, used as a friction clutch and this may be very easily accomplished simply by giving the face friction wheel 14 a very slight movement, approximately one-sixteenth of an inch toward and from the coöperating peripheral friction wheels 15. The knuckle joint 11 will permit the required slight endwise movement of the shaft section 12 to which the friction wheel 14 is secured, necessary to accomplish the above result. As shown in Fig. 3, a pair of thrust collars 39 and 40 and an interposed coiled spring 41 are placed on the shaft section 12 within a cavity of the bearing 13. The thrust collar 39 bears against a shoulder on the said shaft section, and the collar 40 is engaged by a depending arm 42 of a rock shaft 43 that is journaled in suitable bearings on the frame 1 and provided with an upwardly extended arm 44 that is connected to a lever operated link 45. The link 45 will preferably be connected to a foot lever, not shown, so that the friction wheel 14 will be held in frictional driving engagement with the wheels 15, when and only when the lever 44 is drawn forward by the pressure on the said foot lever. This foot lever construction is well understood, and hence, not illustrated. It will thus be seen that the friction wheels 14, 15—15 afford a combined friction clutch and frictional differential gear mechanism.

Any suitable, or any of the many well known variable speed reversing gear devices may be employed to connect the adjacent ends of the engine driven shafts 8 and 10, and these gears are preferably located within the casing 9. As shown, they comprise as follows: The numerals 24 and 25 indicate spur gears that are arranged to slide upon the shaft 8, but are caused to rotate therewith by a long key 26. The gear 25 is larger than the gear 24 and both of the gears are provided with grooved hubs that are engaged by shipper arms 27. One of the shipper arms 27 is secured to an endwise movable adjusting rod 28, and the other is secured to an adjusting sleeve 29, which latter surrounds the said rod 28. The said rod and sleeve are mounted in suitable bearings on the casing, and by adjustments thereof, the gears 24 and 25 may be independently a lid on the shaft 8. The gear 24 has a half clutch 30 that is engageable with the half clutch 31 of a spur pinion 32 secured on the adjacent end of the shaft 10. The pinion 32 meshes with a spur gear 33 carried by a counter shaft 34 journaled in suitable bearings in the casing 9. This counter shaft 34 also carries spur gears 35, 36 and 37. The gear 37 runs in mesh with an intermediate gear 38 which is suitably journaled to the casing 9 and is shown in part in Fig. 2. When the gear 24 is shifted so as to engage the half clutch 30 with the half clutch 31 of the pinion 32, the shaft or shaft section 10 will be rotated at the same speed as the shaft or shaft section 8; or, in other words, with the same speed as the engine crank shaft. When the said gear 24 is shifted into engagement with the gear 35, the shaft 10 will be rotated at a higher rate of speed than the shaft 8, but in the same direction. When the gear 25 is shifted into mesh with the gear 36, the shaft 10 will be driven at another speed but in the same direction as the shaft 8; and when the said gear 25 is shifted into mesh with the intermediate gear 38, the said shaft 10 will be driven in a direction reverse from that of the said shaft 8.

With the arrangement above described, it is evident that the speed and power of the engine are transmitted variably and in either direction to the driving friction wheel 14 of the frictional differential gear, and that it is then differentially transmitted to the traction wheels through the said friction gear. This is a highly desirable and thoroughly practicable arrangement for automobile transmission mechanism.

The three friction wheels 14, 15—15 are stated as permanently located to distinguish them from frictional wheels that are relatively adjustable, for the purpose of varying speed. The very slight movement given to the wheel 14, necessary to attain the frictional clutch action, is not such an adjustment as to render the above statement materially incorrect.

What I claim is:

1. The combination with a motor and traction wheels, of a motor propelled vehicle, a variable speed toothed gear drive driven from said motor, and a frictional gear mechanism having three coöperating friction wheels, one of which is driven from said toothed gear drive, and the other two of which are connected, one to each of the traction wheels.

2. The combination with a motor and traction wheels, of a motor propelled vehicle, a variable speed toothed gear drive driven from said motor, a frictional gear mechanism having three coöperating friction wheels, one of which is driven from said toothed gear drive and the other two of which are connected, one to each of the traction wheels, and means for moving the first noted of said friction wheels into and out of engagement with the other two friction wheels, whereby they are caused to operate as a combined frictional transmission and clutch.

3. The combination with three coöperating permanently located friction wheels, two thereof being driven from the third friction wheel and each of said two driven wheels being connected to a corresponding traction wheel, a reversible variable speed toothed gear drive, a shaft connecting said motor to one of the elements of said toothed gear drive, and a counter shaft connecting another of the elements of said toothed gear drive to the third or driving member of said friction wheels.

4. The combination with the motor, the traction wheels and the variable speed toothed gear drive of a motor propelled vehicle, of three coöperating friction wheels, the first being driven from said toothed gear drive, and the other two being connected to the respective traction wheels, the said three friction wheels being permanently located, but the said first friction wheel having a slight movement to throw the same into and out of frictional driving action on the said coöperating friction wheels, whereby the said three friction wheels serve as a combined friction clutch and frictional driving gear mechanism.

In testimony whereof I affix my signature in presence of two witnesses.

ROBERT E. CARSWELL.

Witnesses:
F. D. MERCHANT,
HARRY D. KILGORE.

Copies of this patent may be obtained for five cents each, by addressing the "Commissioner of Patents, Washington, D. C."